(12) United States Patent
Yamamoto

(10) Patent No.: US 6,369,150 B1
(45) Date of Patent: Apr. 9, 2002

(54) ELECTROMAGNETIC RADIATION ABSORPTION COMPOSITION

(75) Inventor: Ario Yamamoto, Ashiya (JP)

(73) Assignee: Tayca Corporation, Osaka-fu (JP)

( * ) Notice: Subject to any disclaimer, the term of this patent is extended or adjusted under 35 U.S.C. 154(b) by 0 days.

(21) Appl. No.: 09/671,617

(22) Filed: Sep. 28, 2000

(51) Int. Cl.[7] .................................................. C08K 3/08

(52) U.S. Cl. ....................................... 524/440; 524/497

(58) Field of Search ................................. 524/497, 440

(56) References Cited

U.S. PATENT DOCUMENTS 5,122,418 A * 6/1992 Nakane ........................ 424/401
5,645,752 A * 7/1997 Weiss ......................... 252/62.54

* cited by examiner

Primary Examiner—Paul R. Michl
(74) Attorney, Agent, or Firm—Millen, White, Zelano & Branigan, P.C.

(57) ABSTRACT

A blend of 5 to 30% by weight of particulate titanium slug and the balance of particulate carbonyl iron or metallic iron absorbs electromagnetic radiation over a wide frequency range from sub-GHz to several GHz band regions. The blend is processed into a molding compound or coating formulation by mixing with a polymeric binder.

10 Claims, 3 Drawing Sheets

ELECTROMAGNETIC RADIATION ABSORPTION COMPOSITION

BACKGROUND OF THE INVENTION

This invention relates to a composition for absorbing electromagnetic radiation and, particularly, for absorbing the electromagnetic radiation over a wide range of frequencies from sub-GHz to GHz ($10^6$ to $10^{10}$ hertz) band regions.

It is well-known that magnetic materials such as soft ferrites, carbonyl iron or metallic iron may be used for absorbing electromagnetic radiation (hereinafter referred to as "EMR"). In order to use as an EMR absorbing barriers, such materials are divided into fine particulates or powders, dispersed in a suitable binder and then fabricated into sheets. Since such magnetic materials are capable of absorbing EMR mainly in frequency ranges in the order of several GHz, absorption of EMR in sub-GHz frequency ranges requires the finished sheets to have so large thickness that makes the sheets too heavy and difficult to manufacture.

JP-A-10308596 discloses an EMR absorbing laminate capable of operating in both VHF and UHF band regions. The laminate comprises, in the direction of incident radiation, a dielectric layer containing barium titanate, a second layer containing carbonyl iron or ferrites and a short circuiting metal plate. The first dielectric layer may be formed of sintered or resin-bound barium titanate particles having a thickness from 0.1 to 1.5 mm. The second layer may be formed of resin-bound carbonyl iron particles having a thickness from 1.0 to 4.0 mm. Alternatively, the second layer may be formed of sintered or resin-bound ferrite particles having a thickness from 4.0 to 10.0 mm. This laminate suffers from the same disadvantage as above in terms of large thickness and weight and difficulties in manufacture.

JP-A-11289188 assigned to the assignee of this application discloses an EMR absorbing composition comprising titanium slug. This composition exhibits maximum EMR attenuation at a frequency of around 4.3 GHz.

A need exists, therefore, for an EMR absorbing composition which may be fabricated into an EMR absorbing sheet or layer capable of absorbing EMR over a wide range of frequencies from sub-GHz to several GHz band regions with a relatively small thickness in non-composite structure.

SUMMARY OF THE INVENTION

Figure 1:
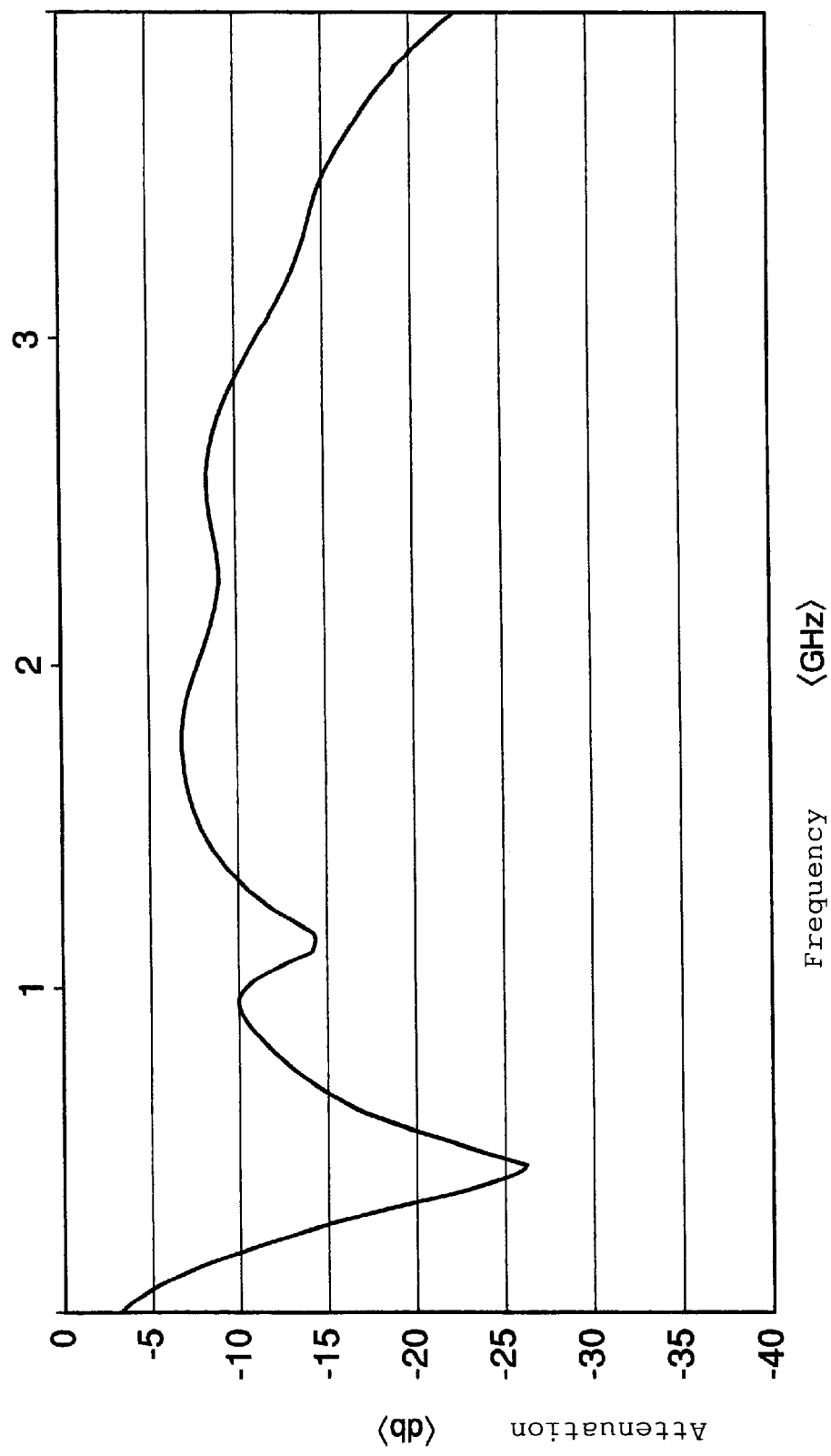
FIG. 1 shows an EMR absorption curve of the composition of Example 1 (the invention)

Surprisingly, it was found that when titanium slug powder is blended with iron or carbonyl iron powder in certain proportions, the maximum attenuation frequency of titanium slug shifts from at around 4.3 GHz to sub-GHz region and that the blend absorbs EMR over a wide frequency range from sub-GHz to several GHz band regions.

Based on this finding, the present invention provides a composition for absorbing electromagnetic radiation comprising a blend of 5 to 30% by weight of particulate titanium slug and the balance of particulate carbonyl iron or iron metal dispersed in a polymeric binder said titanium slug having a titanium content calculated as $TiO_2$ from 70 to 90% by weight.

The polymeric binder may be either thermosetting or thermoplastic depending upon the method of fabricating shaped articles from the composition. Thermosetting resins are used in the compression molding process while thermoplastic resins or elastomers are used in the production of continuous sheets of the EMR absorbing composition of the present invention by the extrusion process and the like. The thermoplastic resin may be a vehicle resin of a coating composition prepared from the EMR absorbing composition of the present invention.

The present invention also relates to articles fabricated from the EMR absorbing composition of the invention.

DETAILED DESCRIPTION OF PREFERRED EMBODIMENTS

"Titanium slug" is produced by smelting desulfurized ilmenite ore in the presence anthracite in an electrical furnace, separating from the resulting molten pig iron, cooling and dividing into particles of a suitable size. Because of its higher titanium content normally as high as 70–95% as $TiO_2$, a large quantity of titanium slug is consumed for the production of titanium dioxide pigments and metallic titanium and titanium alloys. For use in the present invention, particulate titanium slug preferably has an average diameter from 1 to 100 microns, more preferably from 1 to 50 microns.

Particulate metallic iron and particulate carbonyl iron having comparable average diameters are commercially available and may be used in the present invention to advantage. The proportions of particulate titanium slug and particulate metallic iron or carbonyl iron in their blend are 5 to 30% by weight, preferably 10 to 30% by weight for titanium slug, and the balance for metallic iron or carbonyl iron.

In order to fabricate into shaped articles such as sheets by the compression molding process, the blend is further mixed with an amount of thermosetting resins such as phenol resins, melamine resins, epoxy resins and the like. The binder resin is preferably in the form of dry or semi-dry powder to allow dry blending of the three components to produce a molding compound. The amount of resins must be sufficient to impart the molded products with a satisfactory mechanical strength but not in excess. This amount generally ranges from 5 to 60% by combined weight of the three components. The resulting molded products, if necessary, may further be treated with heat to complete the curing reaction of the binder resin. The thermosetting binder resin may be a liquid resin such as unsaturate polyester resins used in the production of FRP. In this case the molding compound may be shaped and thermally cured in a mold without compression.

Thermoplastic resins or elastomers such as polythylene, polypropylene, ethylene-propylene rubber or chlorinated polyethylene may be used for producing continues sheets of the EMR absorbing composition of the present invention using the extrusion or calendering process known in the plastic processing industry.

Finally, the EMR absorbing composition may be formulated into a coating composition or paint. In this case the coating composition may be produced in a manner analogous to the production of conventional decorative or protective paint formulations using the blend of particulate titanium slug and metallic iron or carbonyl iron in place of conventional paint pigments. The binder resin component may be the same as those used in conventional paints as vehicle resins in the form of a solution in a volatile organic solvent or an emulsion or dispersion in an aqueous medium. The coating formulation of the present invention is useful for forming an EMR absorbing layer onto an object on site.

Fabricated articles made of the EMR absorbing composition of this invention exhibits improved capability of absorption of EMR at sub-GHz frequency region while retaining the desired absorptive capability in several GHz region. For example, compression-molded articles made from the composition of this invention are comparable in the absorptive capability of sub-GHz EMR without use of short-circuiting metallic plate to corresponding articles made of ferrite particles having about double thickness. Thus, the composition of this invention finds use in shielding a variety of objects from EMR at a wide range of frequencies in both sub-GHz and GBz band regions.

EXAMPLE

The following examples are offered to illustrate this invention without limiting its scope thereto. Unless otherwise indicated, all parts and percentages are by weight.

1. Preparation of Test Specimen

Particulate titanium slug available from RTZ Iron & Titanium Inc., Canada (titanium content as $TiO_2$ 90%, average diameter 1000 microns) was used. 1 kg of particulate titanium slug was milled by the wet process in a stainless steel-ball mill for 48 hours. The resulting slurry was transferred to a vat and dried at 105° C. for 24 hours. 200 g of this dry powder was taken in an alumina-mortar and further milled for 30 minutes using a pestle made of alumina.

The titanium slug powder thus prepared was mixed with iron carbonyl powder (EW, BASF) or metallic iron powder (300M-200, Kobe Steel Ltd.) and thermosetting resin powder (FINEDIC A-56-102, Dainippon Ink and Chemicals, Inc.) in proportions shown in Table 1 below.

An amount the mixture was compression-molded into a block at a pressure of 3.3 ton/cm² and the molded block was cured at 180° C. for 30 minutes. After cooling, the block was machined into a troidal core shape having an inner diameter of 8.66 mm and an outer diameter of 19.94 mm.

For comparative purposes, similar specimens were produced from titanium slug alone and carbonyl iron alone.

2. Measurement Method

A network analyzer (Model 37269A available from WILTRON) was used in the measurement. Each specimen was placed in the network analyzer and tested for EMR absorbing performance by the open short method.

Example 1 and Comparative Examples 1–2

TABLE 1

| Material, parts | Ex. 1 | Com.Ex.1 | Com.Ex.2 |
|---|---|---|---|
| Titanium slug | 10 | 100 | — |
| Carbonyl iron | 90 | — | 100 |
| Binder resin | 7 | 7 | 7 |

Figure 2:
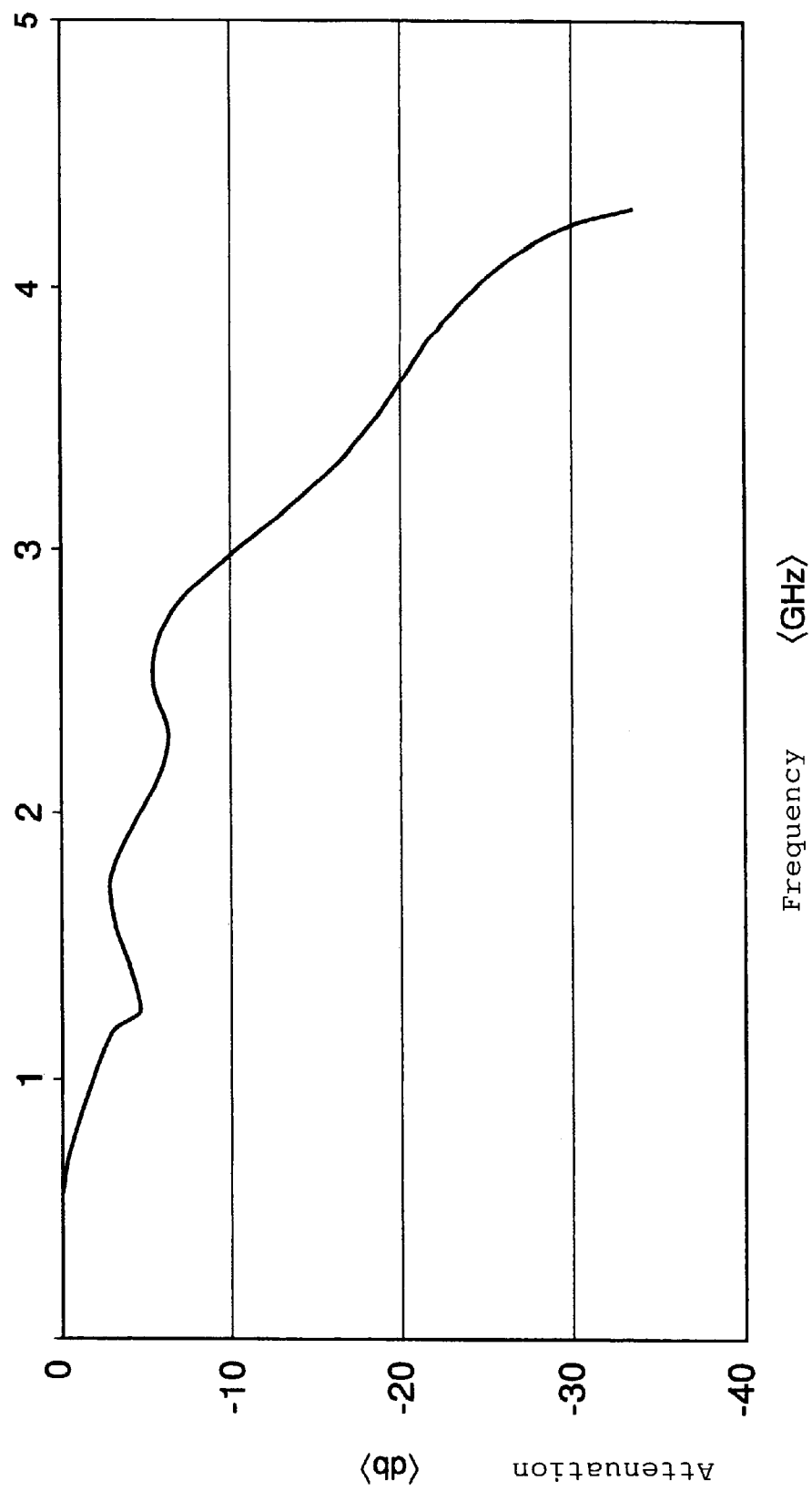
FIG. 2 shows a similar curve of the composition of Comparative Example 1.
Figure 3:
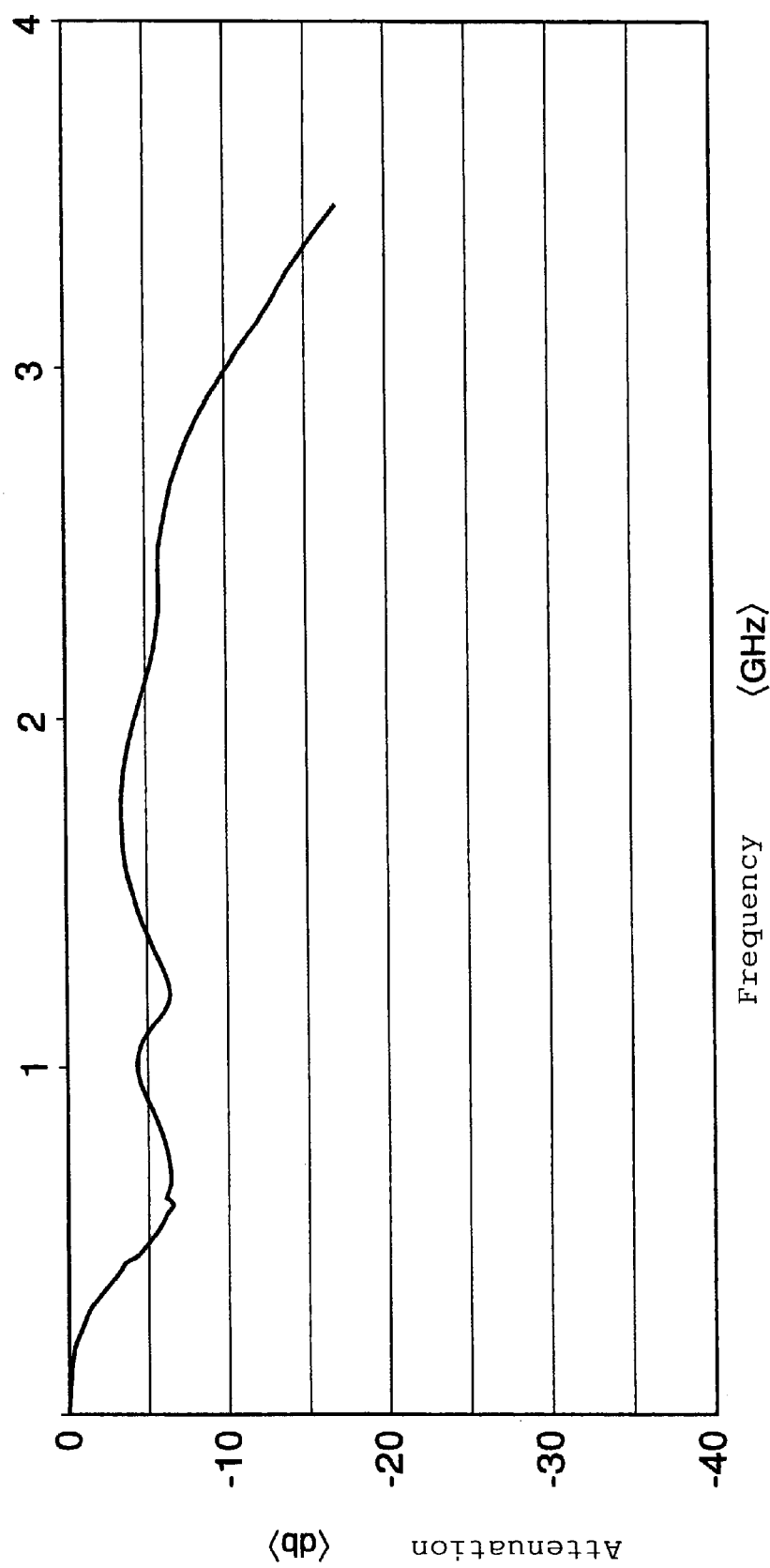
FIG. 3 shows a similar curve of the composition of Comparative Example 2.

Test results of specimens of Example 1, Comparative Example 1 and Comparative Example 2 are shown in FIG. 1, FIG. 2 and FIG. 3, respectively. A remarkable absorption of EMR at sub-GHz region is seen in the curve of FIG. 1 while such absorption is not seen in the curves of FIG. 2 and FIG. 3.

Example 2 and Comparative Examples 3–4

Analogous to the preceding Example and Comparative Examples, specimens were made from a 10:90 blend of titanium slug and metallic iron powder (Example 3), titanium slug alone (Comparative Example 3) and iron powder alone (Comparative Example 4), respectively, with varying amounts of binder resin and specimen thickness. The EMR absorptive performance of these specimens were evaluated in a similar manner as above and are reported in Tables 2–4 below.

TABLE 2

Example 2 (titanium slug:iron powder = 10:90)

| % Binder* | Specimen thickness (mm) | Peak absorption frequency (GHz) | Attenuation (dB) |
|---|---|---|---|
| 20 | 10.80 | 1.2350 | −11.98 |
|  | 20.30 | 0.5240 | −14.60 |
|  | 25.90 | 0.4270 | −16.60 |
| 30 | 10.30 | 1.6550 | −18.35 |
|  | 15.00 | 1.0090 | −19.37 |
|  | 20.30 | 0.7500 | −33.48 |
|  | 25.30 | 0.5890 | −41.26 |
| 40 | 10.80 | 1.2350 | −11.99 |
|  | 20.30 | 0.5240 | −14.57 |
|  | 25.90 | 0.4270 | −16.60 |

*Based on the total weight of specimen

TABLE 3

Comparative Example 4 (titanium slug alone)

| % Binder* | Specimen thickness (mm) | Peak absorption frequency (GHz) | Attenuation (dB) |
|---|---|---|---|
| 20 | 10.20 | 1.3960 | −13.58 |
|  | 17.70 | 0.7829 | −10.39 |
|  | 27.85 | 0.4920 | −9.73 |
| 30 | 10.20 | 1.7310 | −9.46 |
|  | 15.00 | 1.0960 | −8.52 |
|  | 20.20 | 0.8590 | −7.29 |
|  | 25.25 | 0.6776 | −7.22 |
| 40 | 5.20 | 4.0450 | −8.30 |
|  | 10.30 | 2.0410 | −7.44 |
|  | 15.05 | 1.4010 | −6.10 |
|  | 20.30 | 1.0330 | −4.74 |
|  | 25.30 | 0.8390 | −4.85 |

*Based on the total weight of specimen

TABLE 4

Comparative Example 4 (iron powder alone)

| % Binder* | Specimen thickness (mm) | Peak absorption frequency (GHz) | Attenuation (dB) |
|---|---|---|---|
| 20 | 10.25 | 1.4610 | −14.06 |
|  | 20.40 | 0.6210 | −18.54 |
|  | 25.45 | 0.4922 | −20.06 |
| 30 | 10.30 | 2.0100 | −28.89 |
|  | 14.90 | 1.3320 | −30.47 |
|  | 20.20 | 0.9440 | −23.27 |
|  | 25.30 | 0.7180 | −21.18 |
| 40 | 5.20 | 5.6200 | −13.29 |
|  | 10.00 | 2.6880 | −13.75 |
|  | 15.25 | 1.6530 | −14.96 |
|  | 20.45 | 1.1700 | −13.52 |
|  | 25.25 | 0.9440 | −12.55 |

*Based on the total weight of specimen

The above test results indicate that the peak absorption frequencies of the specimens of a 10:90 blend of titanium slug and iron powder (Example 2) have shifted toward lower frequency side in comparison with specimens of titanium slug alone (Comparative Example 3) or specimens of iron powder alone (Comparative Example 4).

What is claimed:

1. A composition for absorbing electromagnetic radiation comprising a blend of 5 to 30% by weight of particulate titanium slug and the balance of particulate carbonyl iron or metallic iron dispersed in a polymeric binder, said titanium slug having a titanium content calculated as $TiO_2$ from 70 to 90% by weight.

2. The composition of claim 1 wherein the proportion of said polymeric binder is from 5 to 60% by the combined weight of said titanium slug, said carbonyl iron or metallic iron and said resin.

3. The composition of claim 1 wherein said polymeric binder is thermosetting.

4. The composition of claim 1 wherein said polymeric binder is thermoplastic.

5. The composition of claim 1 wherein said particulate titanium slug has an average diameter from 4 to 100 microns.

6. The composition of claim 1 wherein said particulate carbonyl iron or metallic iron has an average diameter from 4 to 100 microns.

7. A molding compound comprising the composition of claim 1.

8. Shaped articles fabricated the molding compound of claim 7.

9. A coating formulation comprising the composition of claim 1.

10. A coating layer on a substrate formed of the coating formulation of claim 9.

* * * * *